S. POOLE.
TOASTERS AND BROILERS.
No. 195,306. Patented Sept. 18, 1877.
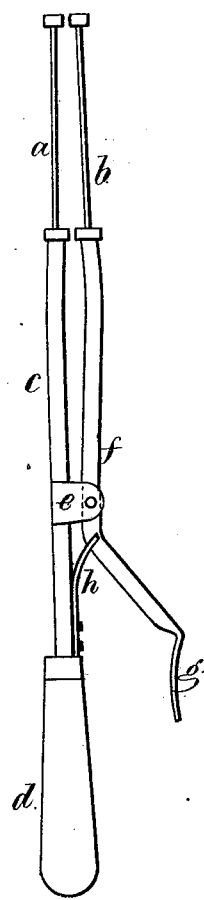 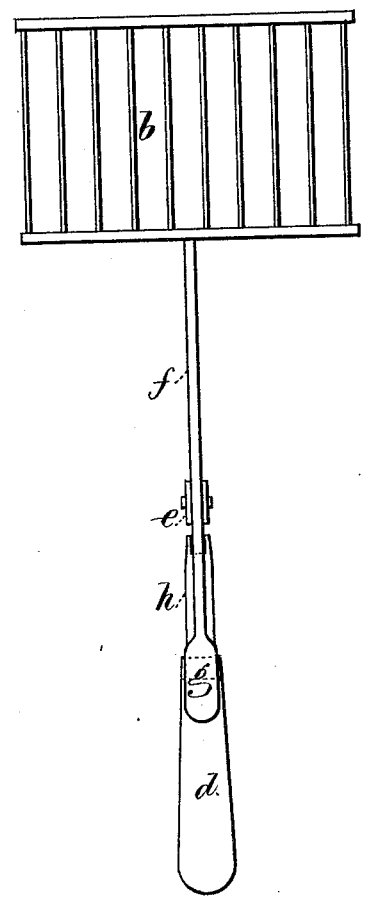

UNITED STATES PATENT OFFICE.

SAMUEL POOLE, OF BROOKLYN, NEW YORK.

IMPROVEMENT IN TOASTERS AND BROILERS.

Specification forming part of Letters Patent No. 195,306, dated September 18, 1877; application filed June 13, 1877.

*To all whom it may concern:*

Be it known that I, SAMUEL POOLE, of Brooklyn, in the county of Kings and State of New York, have invented an Improvement in Toasters and Broilers, of which the following is a specification:

I make use of two gridiron-frames, one of which is attached to a bar that extends to a handle, and the other is connected with a lever and thumb-piece, and pivoted to the main bar, and a spring is provided to press the two gridirons together and hold whatever is placed between them.

This instrument is very useful in broiling meats and in toasting bread and other articles, because it can be opened and closed by pressure at the thumb-piece, where the parts are not in a heated condition.

In the drawing, Figure 1 is a side view of the broiler, and Fig. 2 is an edge view of the same.

The gridiron-frames $a$ $b$ are of any desired size, and the frame $a$ is permanently fastened to the bar $c$, that extends to the wooden handle $d$. Upon this bar $c$ are the pivot-jaws $e$, between which the lever $f$ lies, and to which it is pivoted. This lever has a thumb-piece, $g$, at one end, and the other end is attached to the frame $b$. There is a spring, $h$, that tends to press the frames $a$ $b$ together so as to hold any article that may be placed between them.

The gridiron-frames can be opened to remove or insert any article by pressing on the thumb-piece $g$.

I claim as my invention—

The gridiron-frames $a$ $b$, attached to the bar $c$ and lever $f$, respectively, in combination with the fulcrum-jaws $e$ upon the bar $c$, the thumb-piece $g$ at the end of the lever $f$, and spring $h$, between the bar $c$ and lever $f$, as and for the purposes set forth.

Signed by me this 11th day of June, A. D. 1877.

SAMUEL POOLE.

Witnesses:
   GEO. T. PINCKNEY,
   HAROLD SERRELL.